(12) United States Patent
Benko et al.

(10) Patent No.: US 10,013,143 B2
(45) Date of Patent: Jul. 3, 2018

(54) INTERFACING WITH A COMPUTING APPLICATION USING A MULTI-DIGIT SENSOR

(71) Applicant: Microsoft Technology Licensing, LLC, Redmond, WA (US)

(72) Inventors: Hrvoje Benko, Seattle, WA (US); Daniel Wigdor, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 325 days.

(21) Appl. No.: 14/339,793

(22) Filed: Jul. 24, 2014

(65) Prior Publication Data

US 2014/0337806 A1 Nov. 13, 2014

Related U.S. Application Data

(63) Continuation of application No. 12/767,804, filed on Apr. 27, 2010, now Pat. No. 8,810,509.

(51) Int. Cl.
*G06F 3/048* (2013.01)
*G06F 3/0482* (2013.01)
*G06F 3/0488* (2013.01)
*G06F 3/01* (2006.01)

(52) U.S. Cl.
CPC .......... *G06F 3/0482* (2013.01); *G06F 3/017* (2013.01); *G06F 3/04883* (2013.01); *G06F 2203/04808* (2013.01)

(58) Field of Classification Search
CPC ..... G06F 3/0482; G06F 3/017; G06F 3/04883
See application file for complete search history.

(56) References Cited

U.S. PATENT DOCUMENTS

| 2002/0097229 | A1* | 7/2002 | Rose | G06F 1/1626 345/173 |
| 2007/0177804 | A1 | 8/2007 | Elias et al. | |
| 2008/0168403 | A1* | 7/2008 | Westerman | G06F 3/04883 715/863 |
| 2009/0153288 | A1* | 6/2009 | Hope | G06F 3/0482 340/3.1 |

(Continued)

OTHER PUBLICATIONS

"Search Report Issued in European Patent Application No. 11777766.4" Mailed Date: Jan. 23, 2017, 4 Pages.

(Continued)

*Primary Examiner* — William Bashore
*Assistant Examiner* — Gregory A Distefano

(57) ABSTRACT

A technology is described for interfacing with a computing application using a multi-digit sensor. A method may include obtaining an initial stroke using a single digit of a user on the multi-digit sensor. A direction change point for the initial stroke can be identified. At the direction change point for the initial stroke, a number of additional digits can be presented by the user to the multi-digit sensor. Then a completion stroke can be identified as being made with the number of additional digits. A user interface signal to can be sent to the computing application based on the number of additional digits used in the completion touch stroke. In another configuration of the technology, the touch stroke or gesture may include a single stroke where user interface items can be selected when additional digits are presented at the end of a gesture.

20 Claims, 3 Drawing Sheets

(56) References Cited

U.S. PATENT DOCUMENTS

| | | | |
|---|---|---|---|
| 2009/0189868 A1* | 7/2009 | Joo | G06F 3/04883 |
| | | | 345/173 |
| 2010/0188423 A1* | 7/2010 | Ikeda | G06F 3/03547 |
| | | | 345/659 |
| 2011/0185321 A1* | 7/2011 | Capela | G06F 3/0488 |
| | | | 715/863 |
| 2013/0067411 A1* | 3/2013 | Kataoka | G06F 3/04883 |
| | | | 715/835 |

OTHER PUBLICATIONS

"Extremely Efficient Menu Selection: Marking Menus for the Flash Platform", Retrieved from <<http://www.betriebsraum.de/blog/2009/12/11/extremely-efficient-menu-selection-marking-menus-for-the-flash-platform>>, Dec. 11, 2009, pp. 1-9.

"Office Action Issued in European Patent Application No. 11777766.4", Mailed Date: Feb. 14, 2017, 8 Pages.

* cited by examiner

INTERFACING WITH A COMPUTING APPLICATION USING A MULTI-DIGIT SENSOR

RELATED APPLICATIONS

This application is a Continuation of application Ser. No. 12/767,804 filed Apr. 27, 2010 (pending and allowed), which is incorporated herein by reference in its originally filed form.

BACKGROUND

Selecting items from a menu of functions is a basic computer interaction task when a user interface is used by an end user. Most current menu designs assume that the user has a single interactive point for input which means the menu can be traversed in a linear fashion. For example, a user may have a mouse cursor or a stylus which allows the user to select menu items one by one. In general, such menus can be activated by clicking on an item or by dragging and/or crossing the interaction point through the menu item. Dragging or crossing the interaction point through the menu item is often used with a stylus for a marking menu or a crossing menu system.

In a system with many menu options, the menus are often nested and this means opening a menu item may open a new sub-menu. The use of nesting menus forces the user to traverse many menu items before arriving at their final choice. This process is comparatively slow and potentially error-prone.

In recent years, computer interface hardware has been produced that can recognize when a user presents the user's digits to a sensor device. For example, certain hardware can recognize when a user touches multiple points on a computer screen, interface pad, or interface surface. These multi-digit recognition systems that can register multiple digits (e.g., multiple touch points) for the user interface can be called multi-digit interface systems. In such multi-digit interface systems, the menu design has not taken advantage of the multiple-points of interaction to enhance the menu interaction. As a result, the menus used in multi-digit interface systems have generally remained the same as in the single digit or single interaction point interface systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for interfacing with a computing application using a multi-digit sensor. One method may include obtaining an initial stroke using a single digit of a user on the multi-digit sensor. A direction change point for the initial stroke can be identified. At the direction change point for the initial stroke, a number of additional digits can be presented by the user to the multi-digit sensor. Then a completion stroke can be identified as being made with the number of additional digits. A user interface signal to can be sent to the computing application based on the number of additional digits used in the completion stroke. In another configuration of the technology, the stroke or gesture may include a single stroke where user interface items can be selected when additional digits are presented at the end of a gesture.

DETAILED DESCRIPTION

Figure 1:
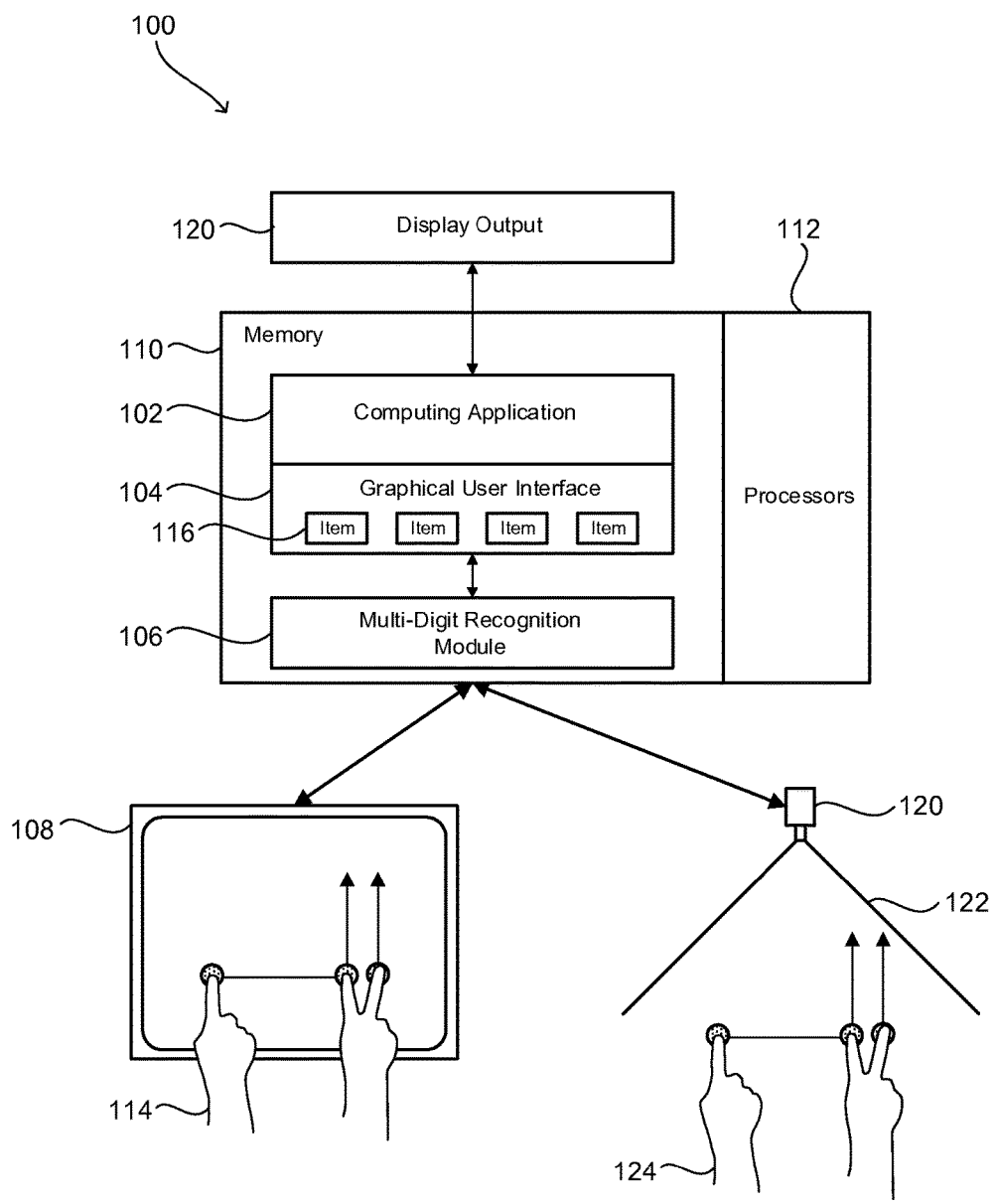
FIG. 1 is a block diagram illustrating a system for interfacing with a computing application using a multi-digit sensor.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

The present technology provides the use of a set of user digit gestures or digit strokes that can reduce the amount of existing menu nesting by enabling a user to more directly select from a larger set of menu options. The gestures can be composed of a finger or hand stroke in combination with a varying number of user digits sensed by a multi-digit sensor. Examples of a multi-digit sensor can include a multi-touch surface device, multi-touch screen, or an optical sensor. The digits used by the user can include the fingers and thumbs. The number of digit contacts together with the shape of the gesture determines which of the several options may be invoked. These gestures are straight-forward to remember, perform, and be detected by the system. In addition, the gestures are also distinct enough not to be frequently randomly invoked or confused with other gestures used for interfacing with a computing device.

FIG. 1 illustrates a system for interfacing with a computing application using a multi-digit sensor 100. The system may include a multi-digit sensor capable of sensing multiple digits (e.g. fingers and thumbs) of a user. In one example configuration, a multi-touch surface device 108 can be configured to detect multiple input touch points from a user 114 when the user touches the user's digits to the sensing surface. The multi-touch surface device may be a multi-touch pad attached as a peripheral or an integrated multi-touch screen device. Many multi-touch devices use capacitive sensing technology, while other multi-touch devices may use optical reflection or other existing touch sensing technologies.

Another example type of a multi-digit sensor may be a motion and/or depth sensor 120 that can be used to sense a user's gestures 124. An example depth sensor may include an infrared projector that projects an infrared beam 122 combined with an optical sensor (e.g. CMOS complementary metal-oxide-semiconductor chip). The sensing range of the depth sensor may be adjustable, so the sensor can automatically depth calibrate in response to the user's physical environment, such as the presence of furniture. Infrared may also allow the multi-digit sensor to sense a user's digits under many types of ambient light conditions. Other types of optical sensors may be used such as a laser sensors, light sensors, or visual cameras.

A computing application 102 can be configured to receive input through a user interface or a graphical user interface 104. The computer software application can be executing on one or more processors 112. For example, the computer software application can be executing on a desktop workstation, server, handheld computing device or another type of computing device. The graphical user interface that is stored in a computer memory 110 may be displayed to an end user via a display output 120 or display screen. In one embodiment, the display output may be an independent output device or the display output may have the multi-touch surface attached directly over the display output. The user interface may also be an audio interface, a touch interface or another interface that is perceptible to a human and where menu sub-items can be chosen.

A multi-digit recognition module 106 can be in communication with the graphical user interface 104. The multi-digit recognition module can be configured to obtain and interpret the electronic signals from the multi-digit sensor device. In one embodiment, the multi-digit recognition module can be a device driver in communication with the graphical user interface and computing application through an operating system.

The input signals received by the multi-digit recognition module can include signals representing a gesture and a number of additional digits presented by the user on the multi-digit sensor device. The term "presented" as used here is defined as a user providing their digits to the digit sensor so that the sensor can recognize a gesture, hand sign, or number of fingers in a gesture. The additional digits may be the additional three fingers and/or thumb on the user's hand. For example, the gesture may be a user moving one finger in a straight or curved line away from an initial point or starting point. In addition, the gesture may be an L-shape or another shape with corners that indicates that the user desires to provide a command to the computing application.

A user interface item 116 in the user interface can be configured to activate a selected user interface function in response to the gesture and the number of digits communicated to the user interface by the multi-digit recognition module. The multi-digit capabilities of the multi-digit sensor device can be combined together with the gesturing menu design and additional digits for selecting user interface items to extend the number of directly accessible menu items with a single hand stroke and without menu nesting.

This technology provides the ability to cull the menu options displayed based on the combination of the direction of the movement of a gesture and the number of digits presented to the multi-digit sensor device. For example, first move one finger to the left, followed by two fingers down to select a particular sub-option of the left menu. In the case of a multi-touch surface this gesture can be performed without lifting the hand from the surface which increases the speed of the selection. Time spent searching through multiple levels of menus can also be reduced because more menu items are available at a time which flattens the overall menu structure.

FIGS. 2A-2E illustrates an example of gestures that can be used with the present technology. In this example, the gesture can select a user interface function and the presentation or placement of the additional digits can enable selection of sub-options or items in the user interface function. The depicted menu selection process can extend a marking menu with the use of multi-digit gestures. The first hand with a single finger extended in each figure shows the starting position for each hand movement. Then the second hand position shows a number of digits or fingers that may be added to the gesture at a direction change point 240 in FIG. 2A. Both hands represent a single user's hand (in this case their right hand).

Figures 2A, 2B, 2C:
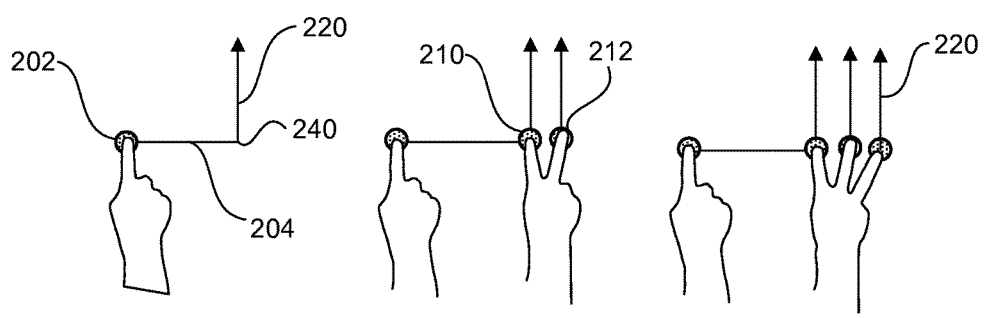
FIGS. 2A-2E illustrate an embodiment of a group of gestures that can be used for interfacing with a computing application using a multi-digit sensor.
Figures 2D, 2E:
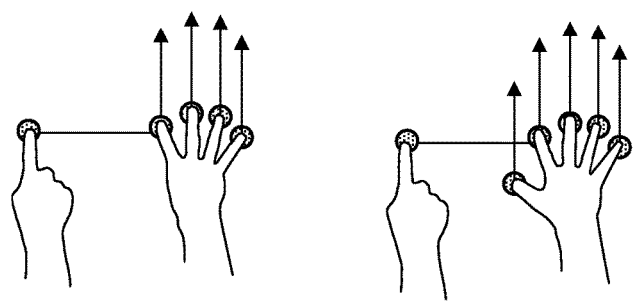

As illustrated in FIG. 2A, the user's finger can be moved away from the initial point 202 and the first straight horizontal line 204 may select the type of function that will be undertaken. As an example, the first line of the gesture that is traced in a direction to the user's right may represent that an editing function is desired.

When the user stops at the end of the line, a direction change may be expected by the interface system. FIG. 2B illustrates that one or more additional menu items 210, 212 or sub-options can be displayed in response to the user's finger tips to help prompt the user regarding which items are available. When a multi-touch surface device is being used, the sub-options can be displayed under the user's finger tips. In the case of an edit function, items such as copy, copy format, cut, paste, or paste special may be the additional items or sub-options. This type of prompting may be provided for users who are new to the interface system, while experts at using this interface may not need graphical prompts. In this example, up to five user digits can be sensed by the multi-digit recognition module. These five different finger configurations, illustrated in FIGS. 2A-2E, can be used to determine which of five user interface items are selected for the gesture. The direction the gesture is made away from an initial point determines which set of five user interface items will be used to make a further selection. Each different direction can have a different item group or set to present to the user. The additional selection can be based on the number of digits sensed by the multi-digit recognition module.

The L-shaped gestures in this example gesture are comparatively uncomplicated to perform, learn, and recognize. These gestures are also easily differentiated from other that gestures may be used to interact with the computing device. The L-shaped gestures have been previously used with a single contact stylus and in the past offered only a single invocation per hand stroke. Whereas, the present technology can offer at least two invocation options per stroke.

As illustrated by FIGS. 2A-2E, the gesture may form a backwards L shape. The initial stroke can be created by the user by moving the single digit away from an initial point. After the initial stroke is completed, a change direction point can be reached. A change direction point is where the direction of a gesture or stroke changes direction at an inflection point or corner. Next, a completion stroke 220 (in FIG. 2C or FIG. 2A) can be performed by the user by moving perpendicular to the initial stroke to form a backwards L. Alternatively, the user may also form a forward L, sideways L facing down, or a sideways L facing up depending on the sub-menu desired to be selected. While the L shape is illustrated here as being orthogonal to a reference side of the sensor device, any rotated orientation of L shape can be used and recognized by the sensor.

While using an L shape is beneficial because it is unlikely to be confused with other interface gestures, the completion stroke can be performed by moving away at another angle to the initial stroke. Instead of moving in a different direction at a 90 degree angle, the completion stroke can move away from the change direction point at some other angle between 0 and 90 degrees. An example of this can be performing the completion stroke at a 45 degree angle to the left or right of the initial stroke.

The L-shaped gestures have been used previously with an interface known as Hover Widgets which were developed by Microsoft. However, the present technology adds the ability to invoke one of a plurality of possible options depending on how many fingers the user has presented to the multi-digit sensor at the direction change point. In the example case, this change direction point is at the corner 240 of the L gesture as in FIG. 2A.

While L-shaped strokes in different directions have been described, the gesture can be other shapes too. For example, defined curved or looping shapes can be used to pick the function and then multiple user digits can be presented to the multi-digit sensor device to select items or sub-options. For example, a partial spiral shape with an inflection on the end may be used. Alternatively, a shape that has multiple change direction points or corners can be used such as a forward or reverse Z shape or a V type shape. Further, the initial stroke may be another distinctive shape that is differentiated from other user interface input strokes.

In some embodiments, the initial stroke can be performed by an East or West stroke with respect to the surface plane of multi-digit sensor device. Then the completion stroke can be performed by moving in a North or South direction with respect to the multi-digit sensor device. Alternatively, the initial stroke can be performed in the North or South direction and the completion stroke can be performed in the East or West direction.

The present technology can use a sequence of one or more hand strokes and a particular number of digits moving in synchrony relative to the multi-digit sensor to invoke a menu option or menu item. When the additional number of digits is presented by the user, the extra digits can move along with part of the hand stroke or gesture from the change direction point to send a user interface signal to the computer application or to complete the selection of the user interface item. As discussed, the technology described can extend the possible space of user interface options that are directly selectable in one user action by a factor of at least five and in some cases 10 or even 20 using directionality. This increase in user selection options at each level can reduce the amount of finger movement on the screen in cases of very large (e.g., deep) menus.

This technology may use a single finger to begin the gesture, but possibly multiple fingers to complete the selection. The expanded selection options allows the system to cull down the number of options displayed on a user interface screen or under a user's fingers on a multi-touch screen, thus reducing visual clutter and providing a simpler and faster way to find and select an item. For example, as soon as the user moves to the user's right (East), the other three options (North, South, and West) can fade away and the sub-options can appear. If performed sufficiently fast in expert use, the user interface visualization of the menu can completely disappear. However, the user can still be sure that a correct menu was selected by knowing how many digits or fingers the user presented to the multi-digit sensor.

While FIGS. 2A-2E illustrate some examples of possible paths for the gestures and presented digits, similar drawings can be generated for all paths that can be traveled in an upward, downward, left and right (North, South, East and West) directions. Additional digits can be presented on such paths to directly select additional sub-options or items. This extends the available menu options at least five times in the case where a single hand is considered or more if an additional hand is used.

Figure 3:
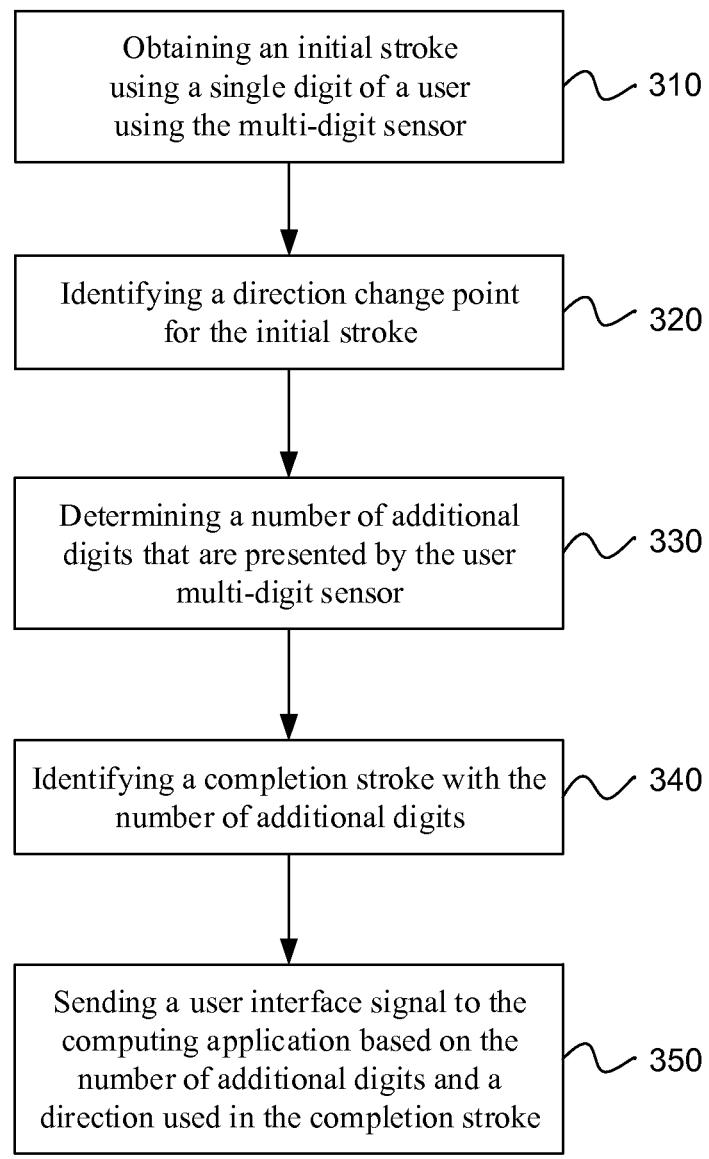
FIG. 3 is a flowchart illustrating an embodiment of a method of interfacing with a computing application using a multi-digit sensor.

FIG. 3 is a flowchart illustrating a method of interfacing with a computing application using a multi-digit sensor device. The method can include the operation of obtaining an initial stroke using a single digit of a user on the multi-digit sensor device, as in block 310. The single digit stroke may be reserved for initiating a command and selecting a starting function point in the user interface menu. A direction change point or intermediate stopping point for the initial stroke can be identified, as in block 320. At this direction change point or inflection point, the system may be configured to expect additional input. For example, a number of additional digits (e.g., fingers and/or thumbs) may be placed by the user on the multi-touch surface device, as in block 330. These additional digits can be presented when the direction change point at the end of the initial stroke with the single digit is reached. The system may identify an additional two digits (or more) that have been presented to the multi-digit sensor device.

A completion stroke with the number of additional digits can also be identified as in block 340. A user interface signal to can be sent to the computing application or a user interface item can be selected in the computing application based on the number of additional digits used in the completion stroke, as in block 350.

In one embodiment, the number of fingers and thumbs can be used to define which menu item is selected. In an alternative configuration, the number of additional menu sub-options displayed at the end of the completion stroke can be reduced based on the number of additional digits used by the user. In the case of reduced menu items at the end of the stroke, an additional selection may be made to determine the final sub-menu or sub-item selection.

In another configuration of the technology, the gesture stroke can be obtained based on a single digit placed on the multi-digit sensor device by a user. When the stopping point for the single gesture stroke on the multi-digit sensor device is identified, then the menu sub-items can be selected when the gesture has stopped. Rather than obtaining a second part of the gesture stroke, the number of additional digits presented by the user to the multi-digit sensor device at the end of the gesture stroke can be determined. As a result, a user interface signal to can be sent to a computing application or a user interface item in the computing application can be selected based on the number of additional digits presented by the user at the stopping point. In contrast to the previous embodiment which has a direction change point, this selection can be made with just one gesture. However, simpler gestures can create more false positives when identifying the gesture. For example, after a single line or curve stroke has stopped, then one or more digits can be placed on the multi-digit sensor device. The additional digits can select an item from the user interface. The single line stroke may also be straight or curved.

Described in other terms, the single gesture of this example selects a defined user interface function and then the placement of the additional digits when the gesture is complete enables selection of sub-items for the user interface function. As discussed before, at least five user digits can be sensed by the multi-digit recognition module and used to determine which of five user interface sub-items is selected for that gesture. The direction of the gesture may be made away from an initial point, and the gesture direction determines which set of five user interface sub-items will be supplied to make a further selection based on the number of digits sensed by the multi-digit sensor device.

In an additional configuration of the technology, both hands can be used to select menu items. When the single gesture is made by either hand, all the remaining nine digits of both hands can be used to select a sub-item when the gesture is completed. Using nine digits can increase the capacity of the menu system by a factor of at least nine and sometimes more using stroke directionality.

In another example interface, cascading of the multi-stroke menus can be provided. A user may first select a sub-menu using the L stroke technique described, and then the user may proceed to select options from that submenu by presenting additional fingers. In a similar manner, two or more L strokes can be chained together to open multiple sub-menus and then the final sub-menu selection can be made when the user presents additional sub fingers to select an item in the last sub-menu that was opened.

To reiterate, the user can begin a menu initiation gesture with a single finger presented to a multi-digit sensor. When the user reaches the corner point or direction change point of the L gesture, the user can present additional digits to specify two to nine or more sub-options or items and directly select a menu item by moving all the placed digits (e.g., fingers and thumbs) in relation to the surface to complete the gesture.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method performed by a computing device comprising a display and an input device, the method comprising:
   receiving inputs from the input device, the inputs having been inputted by interactions of a user with the input device;
   mapping the inputs to strokes, each stroke comprising a discrete unbroken line of input having any arbitrary shape in at least two-dimensions;
   recognizing command gestures to be invoked by the strokes by analyzing features of the strokes to map the strokes to the command gestures, the recognizing including analyzing features of the strokes to identify, as target strokes from among the strokes, all and only those strokes that are not straight lines and that consist of two substantially straight segments connected at respective ends thereof, wherein each target stroke is mapped to a same target command gesture;
   for each identified target stroke mapped to the target command gesture:
      invoking a same function, the function having an input parameter that selects options of the function; and
      determining a value for the parameter by determining whether an adjunct input from the input device was inputted in association with the target stroke, wherein the adjunct input is not part of the identified target stroke and is inputted substantially after initiation of the target stroke, wherein determining that an adjunct input was not inputted in association with the target stroke sets the parameter to a first value, wherein determining that an adjunct was inputted in association with the target stroke sets the parameter to a second value, wherein the first option is selected when the parameter is set to the first value, and wherein the second option is selected when the parameter is the second value.

2. A method according to claim 1, wherein if it is determined that an adjunct input from the input device was inputted in association with the target stroke, then assigning a first value to the parameter of the target command gesture, and wherein if it is determined that an adjunct input from the input device was not inputted in association with the target stroke, then assigning a second value to the parameter of the target command gesture.

3. A method according to claim 1, wherein when an adjunct input is associated with the target stroke, the adjunct input is not associated with any other gesture except the target command gesture corresponding to the target stroke associated with the adjunct input.

4. A method according to claim 1, wherein when an adjunct input is associated with the target stroke, the adjunct input has been inputted by the user substantially after initiation of inputting of the target stroke and before initiation of inputting whichever stroke is the next stroke inputted after the target stroke.

5. A method according to claim 1, wherein function comprises a set of selectable items and the function selects one of the selectable items according to the value of the parameter.

6. A method according to claim 1, wherein when an adjunct input is associated with the target stroke, input of the adjunct input by the user was started substantially at a same time that input of the target stroke was completed by the user.

7. A method according to claim 1, wherein the two segments of the target stroke are substantially perpendicular.

8. A method according to claim 1, wherein the input device comprises a touch sensitive surface, the strokes correspond to finger strokes on the touch sensitive surface.

9. A computing device comprising:
   a display;
   an input device;
   a processor and storage that, when the computing device is operational:
      cooperate to recognize discrete gestures comprising respective input strokes sensed by the input device in correspondence with a user tracing respective physical strokes sensed by the input device,
      make a determination, each time a current one of the input strokes is being handled, whether a control input was inputted in association with, and substantially after initiation of, the current input stroke, wherein the determination is made by determining whether one or more distinct strokes or taps not part of the current input stroke (i) began being sensed by the input device substantially after the current input stroke began being inputted and (ii) were completed at a substantially same time that the current input stroke finished being inputted by the user via the input device and before a next input stroke begins being inputted by the user, and
      according to the determining, invoke operations responsive to the input strokes.

10. A computing device according to claim 9, wherein whether a control input is determined to have been inputted in association with the current input stroke depends on whether a distinct input was initiated during physical tracing of the current input stroke by the user.

11. A computing device according to claim 9, wherein whether a control input is determined to have been inputted in association with the current input stroke depends at least in part on whether a distinct input was initiated substantially at a same time when physical tracing of the current input stroke ends.

12. A computing device according to claim 9, wherein the determination is made responsive to detecting completion of current input stroke.

13. A computing device according to claim 9, wherein whether a control input is determined to have been inputted in association with the current input stroke depends at least in part on whether a distinct input was initiated substantially at a same time when a predetermined feature of the current input stroke was being inputted.

14. A computing device according to claim 13, wherein the current input stroke comprises two consecutive straight segments not aligned, and the feature comprises a point where the segments meet.

15. Storage hardware storing information to enable a computing device, when operating, to perform a process, the process comprising:
   receiving discrete strokes inputted by a user with an input device, the strokes having been sensed by the input device in correspondence with respective physical paths physically traced by the user, each stroke comprising a line of two-dimensional data traced by an input point sensed by the input device; and
   each time any given one of the strokes is detected,
      (i) determining a count of how many, if any, one or more control inputs were initiated by the user with the input device substantially after the given stroke began being inputted and were completed substantially when the given stroke was completed, and
      (ii) executing an action by selecting behaviors of the action according to the count, wherein the count controls which behavior is selected, wherein the one or more control inputs, if any, are not part of the given stroke, and wherein the one or more control inputs, if any, respectively correspond to one or more other input points sensed by the input device.

16. Storage hardware according to claim 15, wherein a control input comprises a tap input or an input point.

17. Storage hardware according to claim 15, wherein a control input comprises an adjunct stroke inputted at a point of the given stroke where the given stroke changed direction.

18. Storage hardware according to claim 15, wherein the action comprises selecting one of a plurality of options, wherein which option is chosen depends on the count of control inputs, if any.

19. Storage hardware according to claim 15, wherein the input device comprises a touch sensitive surface.

20. Storage hardware according to claim 15, wherein strokes having a first count value are handled by executing the action with a first option, and only second of the strokes having a second count value are handled by executing the action with a second action.

* * * * *